United States Patent
Büllesbach

(10) Patent No.: US 8,061,658 B2
(45) Date of Patent: Nov. 22, 2011

(54) LATCHING DEVICE FOR AN ESCAPE CHUTE IN AN AIRCRAFT

(75) Inventor: Tim Büllesbach, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 862 days.

(21) Appl. No.: 12/153,021

(22) Filed: May 13, 2008

(65) Prior Publication Data

US 2009/0020648 A1   Jan. 22, 2009

Related U.S. Application Data

(60) Provisional application No. 60/950,881, filed on Jul. 20, 2007.

(30) Foreign Application Priority Data

Jul. 20, 2007  (DE) .......................... 10 2007 034 471

(51) Int. Cl.
*B64D 25/14* (2006.01)
*B64C 1/34* (2006.01)

(52) U.S. Cl. ..................................... 244/137.2; 244/905

(58) Field of Classification Search ............... 244/137.2, 244/905, 107; 182/48; 193/25 B
See application file for complete search history.

(56) References Cited

U.S. PATENT DOCUMENTS

| 3,852,854 | A | | 12/1974 | Sigrud et al. | |
|---|---|---|---|---|---|
| 4,106,729 | A | | 8/1978 | Bergman et al. | |
| 4,715,562 | A | * | 12/1987 | Bokalot | 244/137.2 |
| 5,106,036 | A | | 4/1992 | Sepstrup | |
| 5,738,303 | A | * | 4/1998 | Hamatani et al. | 244/137.2 |
| 7,090,168 | B1 | * | 8/2006 | Brown | 244/137.2 |

FOREIGN PATENT DOCUMENTS

| EP | 0 192 503 | 8/1986 |
|---|---|---|
| JP | 3-157297 | 7/1991 |

\* cited by examiner

*Primary Examiner* — Tien Dinh
*Assistant Examiner* — Richard R Green
(74) *Attorney, Agent, or Firm* — Jenkins, Wilson, Taylor & Hunt P.A.

(57) ABSTRACT

Latching devices are disclosed for an escape chute in an aircraft, wherein the escape chute has a girt bar for connection to the latching device and the escape chute is accommodated on an aircraft door in a storage container arranged on the inner side thereof. A latching device can include two floor fittings connected to the aircraft, in each of which an end pin of the girt bar can be arranged, a rotating shaft with at least two brackets for movement of the girt bar, two rockers for latching the girt bar, two door fittings, in which the rotating shaft is received so as to be pivotable, and two press-down elements.

9 Claims, 5 Drawing Sheets

LATCHING DEVICE FOR AN ESCAPE CHUTE IN AN AIRCRAFT

Figure 1:
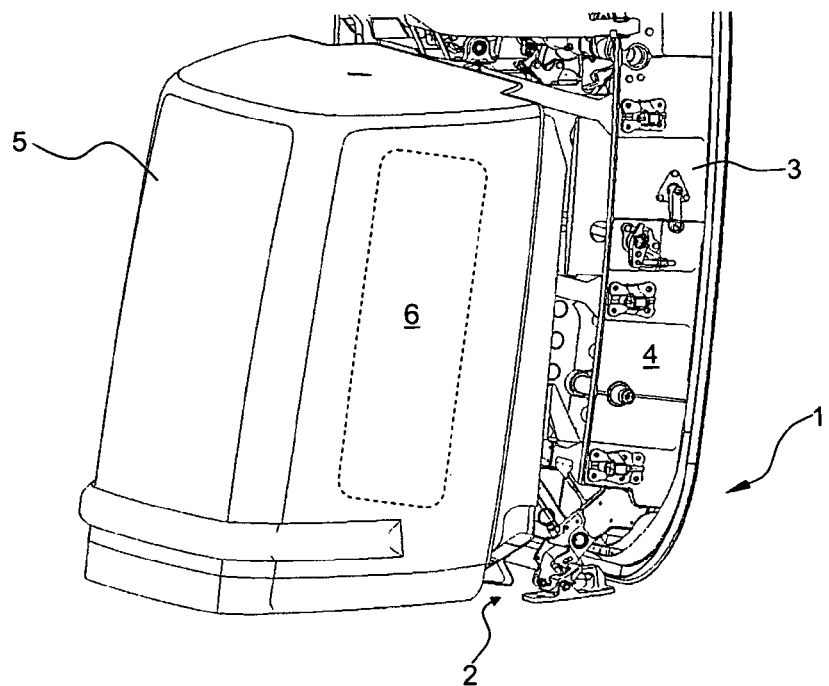

This application claims priority to German Application No. 10 2007 034 471.8 filed 20 Jul. 2007 and claims benefit to US Provisional Application No. 60/950,881 filed 20 Jul. 2007, the entire contents of each of which are hereby incorporated by reference.

The invention relates to a latching device for an escape chute in an aircraft, wherein the escape chute comprises a girt bar for connection to the latching device and the escape chute is accommodated on an aircraft door in a container arranged on the inner side thereof.

In a known embodiment the escape chute is fixed on the inner side of the aircraft door in a luggage container. In the normal state, the aircraft door can be opened and closed by the crew. By means of an additional safety lever the escape chute and the aircraft door can be "sensitized". In this case the escape chute is automatically unfolded when the aircraft door is opened, so that the passengers and crew can leave the aircraft quickly in case of an emergency landing on solid ground and can safely reach the ground.

In case of emergency landing on water by the aircraft the escape chutes may be disconnected from the fuselage of the aircraft in order to be used as life rafts for the passengers and the crew.

In certain emergency situations, however, it is desirable for an escape chute to be removed from one aircraft door and to be reconnected in the region of another aircraft door, in particular to an opposite lying aircraft door.

Such a case is given for example in an emergency landing on water, whereby the aircraft has reached a considerable inclined position in relation to its longitudinal axis as a result of outside conditions. In such a situation it is no longer possible to open the lower lying aircraft doors without the risk of water coming in or against the surrounding water pressure, so that it is desirable for the escape chutes to be disconnected from the lower lying aircraft doors and moved to a higher lying aircraft door. It is hereby assumed that the escape chutes connected to the higher lying aircraft doors have already been -disconnected in order to serve as life rafts.

It is an object of the invention to create a latch for an escape chute in an aircraft which can be easily disconnected or separated from the aircraft door when the latter is in a closed but not "sensitized" state and reconnected or hung on another aircraft door. In addition it is an object of the invention to reduce the number of structural components of the latching device in comparison with known embodiments.

This object is achieved through a latching device with the following features of claim 1:
 a) two floor fittings connected to the fuselage cell, in each of which an end pin of the girt bar can be arranged,
 b) a rotating shaft with two brackets for moving the girt bar,
 c) two rockers for latching the girt bar,
 d) two door fittings, in which the rotating shaft is received so as to be pivotable, and
 e) two press-down elements which are each held in the door fittings by securing means.

The whole latching device has a symmetrical structure, that is to say the left-side components are formed in a mirror image of the right-side components.

The two floor fittings are arranged on the left and right side in a threshold area of an aircraft door situated in the fuselage of the aircraft outside of the movement area for the passengers and the crew. The distance between the floor fittings is around 1 to 1.5 m. A rocker that is pre-tensioned with a spring and can be tilted about an axis of rotation is received in each of the floor fittings. The two rear rocker arms form, in cooperation with a respective receiving area in the floor fittings, a so-called "engagement contour", in which end pins on both sides of the girt bar can be received and constitute the so-called "emergency state". In this emergency state an escape chute which is connected to the girt bar is automatically pulled out of a storage container fixed to the inner side of the aircraft door through the opening of said aircraft door, and after a short delay is automatically inflated and fully unfolded. A carrier is provided as a holder for the escape chute within the storage container.

Furthermore, the device comprises two door fittings which are also fixed to the inner side of the aircraft door and between which a rotating shaft is mounted so as to be pivotable. In the region of the door fittings a respective bracket is fixed to the rotating shaft, whereby these brackets serve for the movement or the pivoting and also the fixing in position of the girt bar.

A press-down element is arranged on each of the door fitting ends and is held by securing means, in particular being held in the area of the door fitting ends by a self-locking ball lock pin that can be easily pulled out by the user in an emergency. When the securing means are pulled out, the press-down elements "fall" out of the door fitting ends. The press-down elements each comprise a roller, whereby these rollers roll on a front rocker arm when the rockers are actuated by the press-down elements.

In a so-called "normal state" the girt bar is held by a press-down element recess in association with a bracket opening and is thus connected to the aircraft door, so that no automatic triggering of the escape chute occurs when the aircraft door is opened.

The switching between the "normal state" and an "emergency state" is realised through the pivoting of the rotating shaft by means of an additional safety lever, not shown in the drawing, which is arranged on the aircraft door in addition to the usual actuating or locking lever for the aircraft door, whereby the girt bar is quasi "transferred" from the door fittings to the "engagement contour" of the floor fittings and vice versa and secured there.

According to the invention in the normal state a user can release the girt bar and hence the escape chute by removing the securing means from the door fittings, so that the escape chute housed in the storage container can be used on another aircraft door. In case of a landing on water for example, wherein the aircraft reaches an inclined position, it is possible to separate an escape chute from a lower lying aircraft door, i.e. possibly already at least partially underwater, which cannot therefore be opened without the risk of water coming in or against water pressure, and to place it on another, higher lying aircraft door. In addition the escape chute can also be released from the aircraft door in the course of maintenance works.

When the securing means are pulled out in order to release the escape chute the press-down elements "fall" simply down from the door fitting ends in question.

Both end pins of the girt bar have a smaller cross-sectional area than a middle portion of the girt bar, so that in both states of the latching device the axial movement possibility of the transverse support is sufficiently limited and a fixed seat of the girt bar is produced.

Further advantageous embodiments of the latching device are shown in the further claims.

Figure 2:
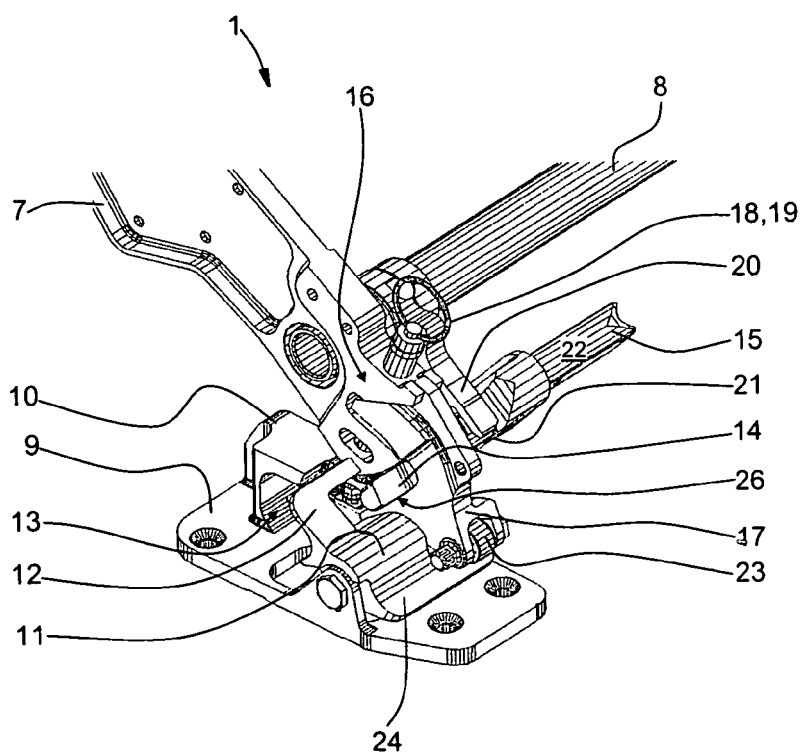
Figure 3:
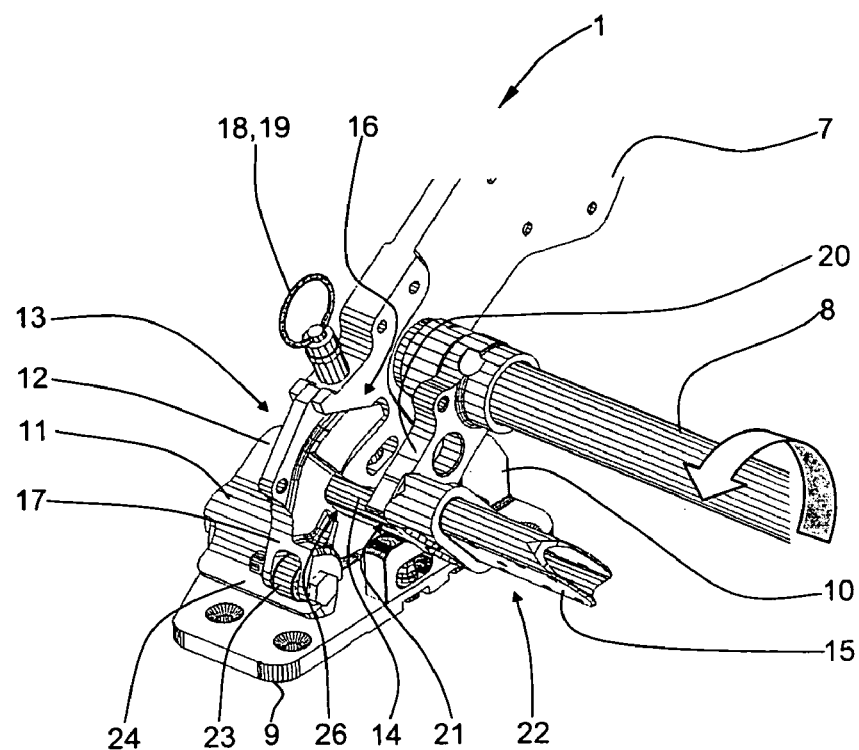
Figure 4:
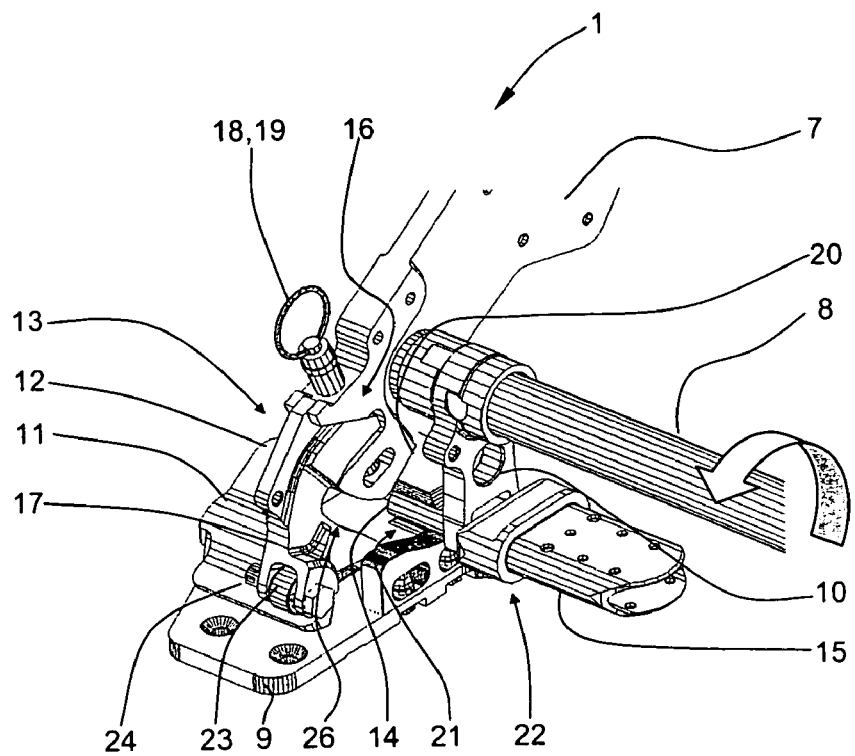
Figure 5:
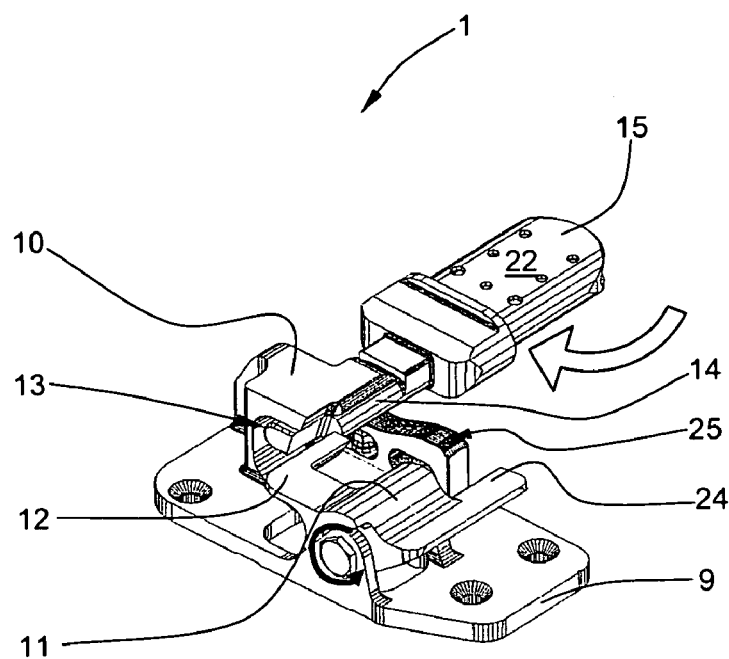
Figure 6:
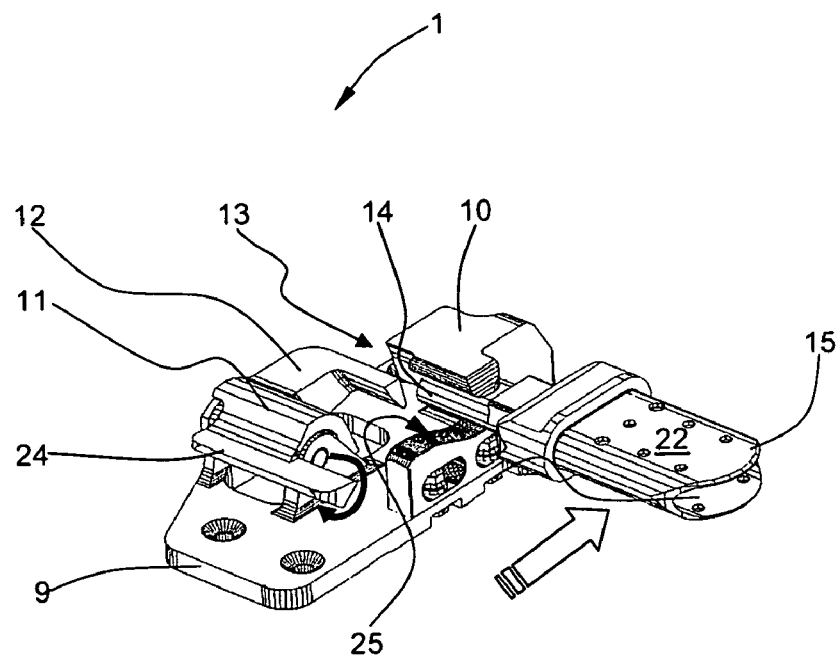
Figure 7:
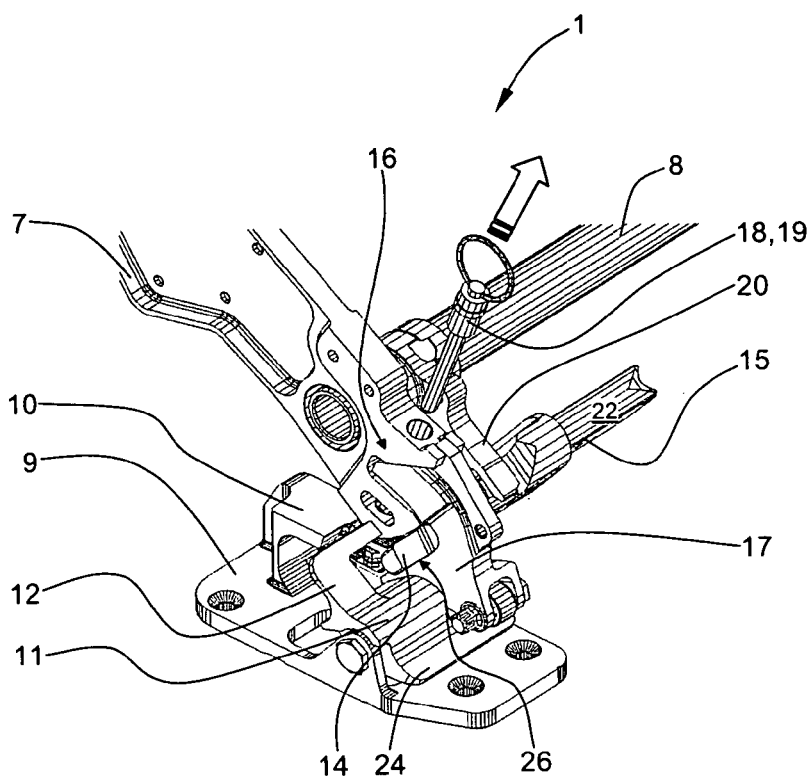
Figure 8:
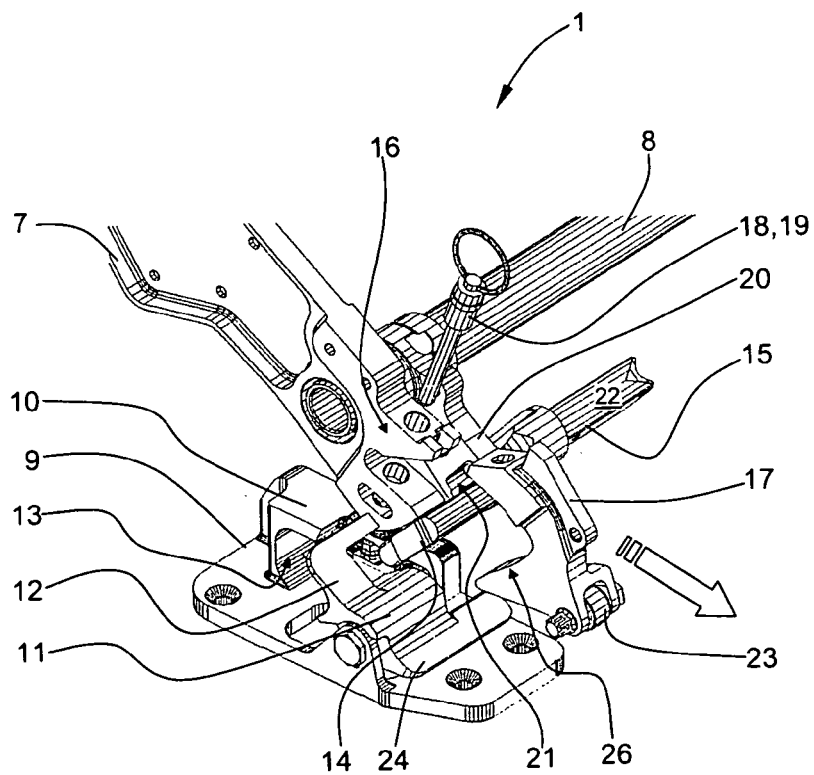
Figure 9:
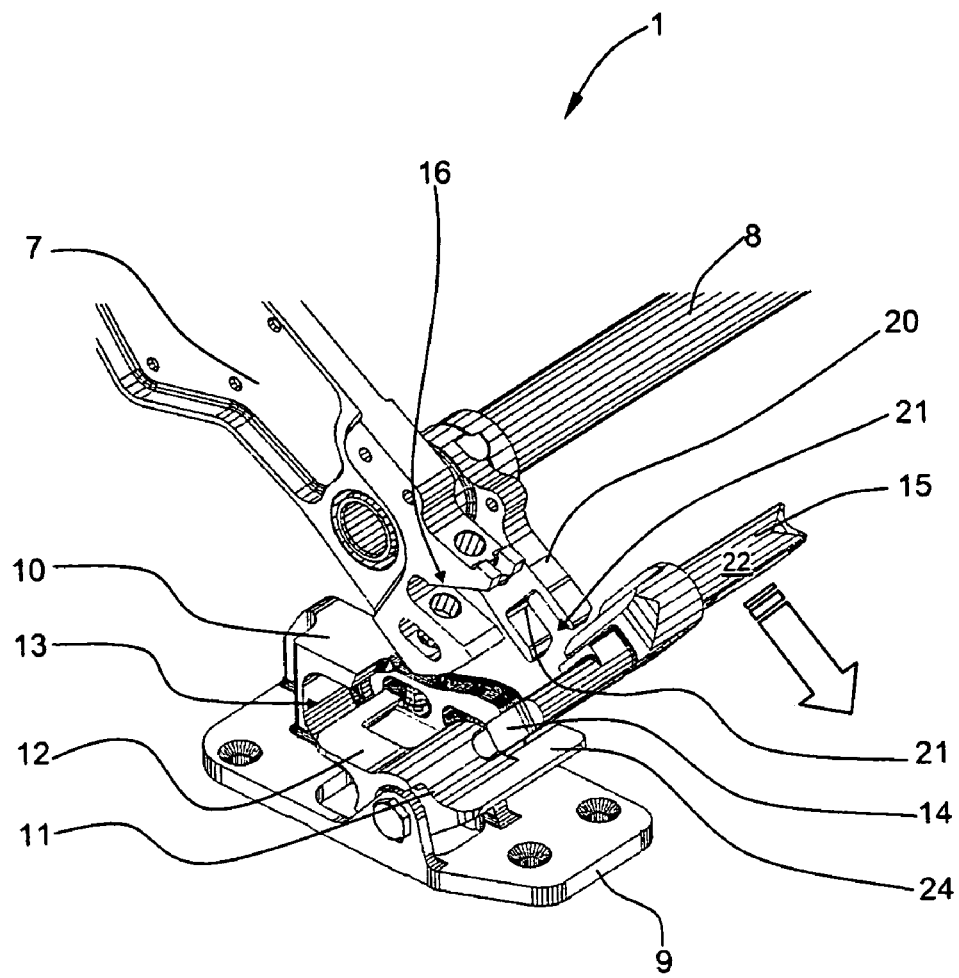

Drawings are attached, in which:

FIG. 1 shows a perspective inner view of the aircraft door with a container for housing the escape chute with a right side of the latching device, FIG. 2 shows a perspective view of the left side of the latching device in the normal state, FIG. 3 shows a further perspective view of the left side of the latching device in the normal state, FIG. 4 shows a perspective view of the left side of the latching device in the emergency state, FIG. 5 a detailed view of the left floor fitting of the latching device with a girt bar hooked in the floor fitting and locked by a rocker in the emergency state, FIG. 6 shows a detailed view of the left floor fitting, seen from another direction, FIG. 7 shows a perspective view of the left side of the latching device in the normal state with the ball lock pin removed for releasing the girt bar from the aircraft door, FIG. 8 shows a perspective view of the left side of the latching device with the press-down element released from the door fitting and the girt bar released, and FIG. 9 shows a perspective view of the left side of the latching device with the girt bar released completely from the aircraft door.

The same structural elements have the same reference numerals in the drawings.

FIG. 1 shows a view of a right part of the latching device 1 in a threshold area 2 of a vehicle door 3 which is inserted in the fuselage cell of the aircraft. A storage container 5 for receiving and storing the escape chute 6 is arranged on an inner side 4 of the aircraft door 3.

A left part of the latching device 1 is concealed by the storage container 5. The left and the right part of the latching device 1 are formed in a mirror image of each other, in such a way that in the remainder of the description of FIGS. 2 to 9 only the left part of the latching device will be represented and clarified. Accordingly, all components of the latching device 1 described below—apart from a rotating shaft for moving the girt bar—are present in duplicate.

In the remainder of the description of the latching device 1 reference is made to FIGS. 2 to 9.

FIG. 2 shows an isometric view of the left part of the latching device 1 which is formed in a mirror image of the right part shown in FIG. 1.

A rotating shaft 8 is mounted so as to be pivotable between two door fittings fixedly connected to the aircraft door 3, of which only the left door fitting 7 can be seen in FIG. 1. Two floor fittings 9 are fixed in a threshold area 2 of the aircraft door 3, of which likewise only the left floor fitting 9 is shown in FIG. 2, in other words being fixedly connected to the fuselage cell of the aircraft. The floor fitting 9 comprises a receiving area 10 on its rear side. Furthermore, a tiltable rocker 11, preloaded with a prestressed spring, is received in the floor fitting 9. A rear rocker arm 12 forms, together with the receiving area 10, an engagement contour 13, in which an end pin 14 of a girt bar 15 can be received. The girt bar 15 is connected to the escape chute 6.

A press-down element 17 is fixed to a door fitting end 16 by securing means 18, in particular in the form of a self-locking ball lock pin 19 that can be pulled out. A shape-locking connection is provided at least area-wise between the door fitting end 16 and the press-down element 17, in order to guarantee a fixed seat on the door fitting end 16 when the securing means 18 are in place. Through the removal of the securing means 18 the press-down element 17 is, if necessary, released from the door fitting 7, that is to say it simply falls down.

Furthermore a bracket 20 with a bracket opening 21 is fixed on the rotating shaft 8. The rotating shaft 8 serves in association with the bracket 20 for the movement or pivoting of the girt bar 15. For this purpose the end pin 14 of the girt bar 15 can be received in the bracket opening 21. A middle portion 22 of the girt bar 15 has a larger cross-section area than the end pin 14, so that an uncontrolled axial displacement of the girt bar 15 between the door fittings 7 is precluded. The press-down element 17 further comprises a roller 23 which rolls on a front rocker arm 24 when the rocker 11 is actuated.

In the illustration of FIG. 2 and FIG. 3 the latching device 1 is in the so-called normal state, that is to say the aircraft door 3 can be opened without the escape chute 6 being triggered. In the normal state the girt bar 15 is fixed in its position in space by the bracket 20, the press-down element 17 in association with the door fitting end 16 and thus follows the opening of the aircraft door 3.

The latching device 1 is in a so-called "emergency state" when the girt bar 15 is received in the engagement contour 13 formed by the rear-side receiving area 10 in the floor fitting 9 and the rear rocker arm 12 and hence connected to the fuselage cell of the aircraft (c.f. in particular FIGS. 4 to 6). In the emergency state, when the aircraft door 3 is opened, the escape chute 6 is automatically pulled out of the storage container 5, because the aircraft door 3 pivots in relation to the fuselage cell and thus causes the automatic inflation of the escape chute 6.

The switching between the normal state and the emergency state is realised with an additional safety lever, not shown, by means of which the rotating shaft 8 can be rotated. The opening, closing and latching of the door with the fuselage cell is realised with an actuating lever provided as standard. Both the safety lever and the actuating lever are arranged on the inner side of the aircraft door and are moved with it.

The latched state of the latching device in FIG. 3 corresponds to that of FIG. 2 but is seen from another direction. In the illustration of FIG. 4 the latching device 1 goes into the emergency state through the pivoting of the rotating shaft 8 in the direction of the white arrow (c.f. FIG. 3). As can be seen from FIG. 4, the end pin 14 of the girt bar 15 is already in the rear side receiving area 10 of the floor fitting 9, but the front rocker arm 24 is still pushed downwards by the roller 23 of the press-down element 17 (not shown, c.f. FIGS. 5 and 6) against the spring force acting in anticlockwise direction, so that the girt bar is not yet finally latched by the rear rocker arm 12 in the receiving area 10.

FIGS. 5 and 6 show, in an enlarged detailed view, the cooperation of the end pin 14 of the girt bar 15 with the floor fitting 9 and also the rocker 11. In both illustrations, the white arrows show the movement direction of the girt bar 15 which is caused by the pivoting of the rotating shaft 8 in association with the bracket 21. Upon pivoting of the end pin 14 of the girt bar 15 into the engagement contour 13, the end pin slides 14 on a curved path 25.

The curved path 25 connects to a curved path 26 which is formed by the lower region of the press-down element recess of the press-down element 17. The movement path of the girt bar 15 is defined by the two curved paths 25, 26.

The rocker 11 which is pre-tensioned by a spring anticlockwise in the direction of the small, black arrow (c.f. FIGS. 5 and 6) pivots after the complete engagement of the end pin 14 into its starting position, so that the girt bar 15 and the escape chute 6 fixed thereto are fixedly connected to the fuselage cell of the aircraft in the emergency state and, upon opening of the aircraft door 3, the escape chute 6 unfolds automatically. The spring tension holds the rocker 11 in the position shown in FIGS. 5, 6.

The mounting of the rocker 11 in the floor fitting 9 is realised on a shaft which is received so that it can rotate on both sides in a bracket-shaped holder which is an integral part of the floor fitting 9.

FIGS. 7 and 8 illustrate the release of the press-down element 17 from the door fitting 7 out of the normal state. As can be seen in particular from FIG. 7, the end pin 14 of the girt bar 15 is secured in the normal state by the bracket 10 in association with the press-down element 17 in its position in space. An axial displacement of the girt bar 15 is prevented by the cross-sectional area of the girt bar 15 in the region of the middle portion 22 which is larger in comparison with the cross-sectional area of the end pin 14. In the emergency state the release of the press-down element 17 is not constructively provided.

Through the removal of the securing means 18, formed in the embodiment shown as a ball lock pin 19, the press-down element 17 falls from the door fitting 7 and the girt bar 15 can be removed.

It hereby becomes possible according to the invention for the first time to release the escape chute 6 together with the storage container 5 from the inner side 4 of the aircraft door 3 and in an emergency, particularly landing on water of the aircraft in an inclined position, to arrange or hang it on another aircraft door, where the escape chute has already been used for the passengers to climb out and as a life boat.

The respective movement directions of the securing means 18 and of the press-down element 17 are symbolised in FIGS. 7, 8 with white arrows. An at least area-wise shape-locking connection exists between the door fitting end 16 of the door fitting 7 and the press-down element 17 when the securing means 18 are inserted, whereby a secure seat of the press-down element 17 is guaranteed on the door fitting end 16. Only by pulling out the securing means 18, in particular in the form of a self-locking ball lock pin 19, is the shape-locking engagement between the press-down element 17 and the door fitting end 16 released, so that the press-down element 17 and hence the girt bar 15 are fully released.

FIG. 9 shows the state of the latching device 1 when the girt bar 15 and escape chute 6 have been completely released and the press-down element 17 removed. In the illustration of FIG. 9 the oval cross-sectional geometry of the end pin 14 of the girt bar 15 can be seen. The end pin 14 additionally has a flattened area (c.f. in particular FIG. 5) which cooperates with the rear rocker arm 12. On account of the fact that the cross-sectional area of the middle portion 22 of the girt bar 15 is greater than that of the end pin 14, an axial displacement of the girt bar 15 in the bracket 20 is avoided. A secure fixing of the position in space of the girt bar 15 on the door fitting 7 in the normal state and in the emergency state of the aircraft door 3 is hereby produced.

As a result of the removal of the press-down element 17 the rocker 11 falls quickly down into the position shown in FIGS. 5, 6, so that the end pin 14 of the girt bar 15 can no longer be arranged in the engagement contour. An undesired engagement of the end pin 14 in the engagement contour 13 is hereby precluded as the rocker 11 has returned to its starting position with the removal of the press-down element 17 (c.f. FIGS. 5, 6).

LIST OF REFERENCE NUMERALS

1 Latching device
2 Threshold area
3 Aircraft door
4 Inner side (aircraft door)
5 Storage container
6 Escape chute
7 Door fitting
8 Rotating shaft
9 Floor fitting
10 Receiving area (floor fitting)
11 Rocker
12 Rear rocker arm
13 Engagement contour
14 End pin
15 Girt bar
16 Door fitting end
17 Press-down element
18 Securing means
19 Ball lock pin
20 Bracket
21 Bracket opening
22 Middle portion (girt bar)
23 Roller
24 Front rocker arm
25 Curved path
26 Curved path

The invention claimed is:

1. Latching device for an escape chute in an aircraft, wherein the escape chute comprises a girt bar for connection to the latching device and the escape chute is accommodated on an aircraft door in a storage container arranged on the inner side thereof, comprising:
   a) two floor fittings connected to the aircraft, in each of which an end pin of the girt bar can be arranged,
   b) a rotating shaft with at least two brackets for movement of the girt bar,
   c) two rockers for latching the girt bar,
   d) two door fittings, in which the rotating shaft is received so as to be pivotable,
   e) two press-down elements which are each held by securing means in the door fittings; and
wherein in a normal state the girt bar can be released from the door fittings by actuating the securing means in order to remove the escape chute for connection to another aircraft door.

2. Latching device according to claim 1, characterised in that in a normal state of the latching device the girt bar is held by the brackets, the press-down elements and the door fittings in its position on the aircraft door in such a way that the aircraft door can be operated without triggering the escape chute.

3. Latching device according to claim 1, characterised in that in an emergency state the girt bar is connected by the rockers and the floor fittings to the fuselage cell of the aircraft in such a way that the escape chute is pulled out when the aircraft door opens.

4. Latching device according to claim 1, characterised in that the latching device of the aircraft door can be placed alternately in a normal state and in an emergency state.

5. Latching device according to claim 1, characterised in that the securing means are formed with at least two ball lock pins that can be pulled out.

6. Latching device according to claim 1, characterised in that the rockers are received in the floor fittings so that they can tilt and are spring loaded.

7. Latching device according to claim 1, characterised in that the press-down elements each comprise a roller, said rollers rolling on front rocker arms when the respective rocker is pushed down.

8. Latching device according to claim 1, characterised in that the floor fittings are arranged on both sides of a threshold area of the aircraft door outside of an area of movement.

9. Latching device according to claim 1, characterised in that a middle portion of the girt bar is formed in hollow construction and the end pins are formed with a mechanically highly loadable metal alloy.

* * * * *